(12) United States Patent
Schatz

(10) Patent No.: US 11,123,809 B2
(45) Date of Patent: Sep. 21, 2021

(54) DRILL BIT

(71) Applicant: BLACK & DECKER INC., New Britain, CT (US)

(72) Inventor: Juri Schatz, Limburg an der Lahn (DE)

(73) Assignee: Black & Decker Inc., New Britain, CT (US)

( * ) Notice: Subject to any disclaimer, the term of this patent is extended or adjusted under 35 U.S.C. 154(b) by 137 days.

(21) Appl. No.: 16/435,907

(22) Filed: Jun. 10, 2019

(65) Prior Publication Data

US 2019/0381582 A1    Dec. 19, 2019

(30) Foreign Application Priority Data

Jun. 14, 2018 (GB) ...................... 1809758

(51) Int. Cl.
  *B23B 51/02* (2006.01)
  *E21B 10/44* (2006.01)
(52) U.S. Cl.
  CPC ............ *B23B 51/02* (2013.01); *E21B 10/445* (2013.01); *B23B 2226/75* (2013.01);
  (Continued)
(58) Field of Classification Search
  CPC .......... B23B 2251/446; B23B 2251/14; B23B 51/02; B23B 2226/75; B23B 2251/18;
  (Continued)

(56) References Cited

U.S. PATENT DOCUMENTS 329,174 A    10/1886  Johnson
5,350,261 A    9/1994  Takaya et al.
(Continued)

FOREIGN PATENT DOCUMENTS

DE    2358447 B1    3/1975
EP    1260296 A1    11/2002
(Continued)

OTHER PUBLICATIONS

English language machine translation of Runge, EPO patent publication No. EP-1260296-A1, published Nov. 27, 2002 (4 pages) (Year: 2002).*
(Continued)

*Primary Examiner* — D. Andrews
*Assistant Examiner* — Michael A Goodwin
(74) *Attorney, Agent, or Firm* — Scott B. Markow

(57) ABSTRACT

A drill bit for drilling into masonry or rock includes a drilling head at its forward end, a clamping shank at its rearward end, and a helical conveying portion extending between the drilling head and the shank. The helical conveying portion includes at least two helically extending flutes separated by at least two helically extending webs. The helical conveying portion has a changeover portion, a pre-changeover portion between the drilling head and the changeover portion, and a post-changeover portion between the changeover portion and the shank. In the pre-changeover portion, the flutes have a pre-changeover pitch, the first web has a first pre-changeover web width α, and the second web has a second pre-changeover web width α'. In the post-changeover portion, the flutes have a post-changeover pitch, the first web has a first post-changeover web width β, and the second web has a second post-changeover web width β'. The post-changeover pitch is greater than the pre-changeover pitch, the first post-changeover web width β is less than the first pre-changeover web width α, and the second post-changeover web width β' is greater than the second pre-changeover web width α'.

20 Claims, 5 Drawing Sheets

(52) U.S. Cl.
CPC ....... *B23B 2251/14* (2013.01); *B23B 2251/18* (2013.01); *B23B 2251/408* (2013.01); *B23B 2251/446* (2013.01)

(58) Field of Classification Search
CPC ......... B23B 2251/406; B23B 2251/408; E21B 10/445; E21B 10/44; Y10T 408/9097
USPC ................................ 175/395, 394; 299/87.1
See application file for complete search history.

(56) References Cited

U.S. PATENT DOCUMENTS

| | | | |
|---|---|---|---|
| 5,478,176 | A | 12/1995 | Stedt et al. |
| 5,888,036 | A | 3/1999 | Arai et al. |
| 6,250,857 | B1* | 6/2001 | Kersten .................. B23B 51/02 175/394 |
| 6,652,203 | B1 | 11/2003 | Risen, Jr. |
| 6,675,917 | B2 | 1/2004 | Kleine et al. |
| D620,334 | S | 7/2010 | Evatt |
| D682,897 | S | 5/2013 | Evatt |
| D682,899 | S | 5/2013 | Evatt |
| 8,727,680 | B2 | 5/2014 | Wada et al. |
| 8,882,411 | B2 | 11/2014 | Koike et al. |
| 9,662,803 | B2 | 5/2017 | Lampe |
| 9,718,136 | B2 | 8/2017 | Stumpp et al. |
| 2002/0040813 | A1* | 4/2002 | Kleine .................. E21B 10/445 175/394 |
| 2002/0053472 | A1* | 5/2002 | Kleine .................... B23B 51/02 175/394 |
| 2009/0148250 | A1* | 6/2009 | Chappell ................ B23B 51/02 408/230 |
| 2012/0039680 | A1* | 2/2012 | Koike ..................... B23B 51/02 408/1 R |
| 2013/0170920 | A1 | 7/2013 | Ogawa |
| 2014/0201995 | A1 | 7/2014 | Wada et al. |
| 2016/0074944 | A1 | 3/2016 | Koga et al. |
| 2016/0129506 | A1 | 5/2016 | Stumpp et al. |
| 2016/0207120 | A1 | 7/2016 | Ogawa et al. |
| 2017/0326652 | A1 | 11/2017 | Koga et al. |
| 2018/0326618 | A1 | 11/2018 | Widmann et al. |

FOREIGN PATENT DOCUMENTS

| | | |
|---|---|---|
| EP | 1405984 A1 | 4/2004 |
| EP | 1405984 A1 | 4/2004 |
| EP | 2845672 A1 | 3/2015 |
| GB | 2184373 A | 6/1987 |
| JP | 2007307642 A | 11/2007 |
| JP | 2010162643 A | 7/2010 |
| JP | 2012110984 A | 6/2012 |
| JP | 2016016481 A | 2/2016 |
| WO | WO-2011/116540 A1 | 2/2011 |
| WO | WO 2012/140570 | 10/2012 |
| WO | WO-2013/065695 A1 | 5/2013 |
| WO | WO-2017/080917 A1 | 11/2016 |

OTHER PUBLICATIONS

Rilliard, Arnaud—Extended European Search Report—dated Oct. 28, 2019—7 pages—European Patent Office—Munich, Germany.
Thomas, Dr. Huw—Search Report re GB1809758.4—dated Dec. 6, 2018—3 pages—United Kingdom Intellectual Property Office—Patents Directorate—South Wales.

* cited by examiner

DRILL BIT

RELATED APPLICATIONS

This application claims priority, under 35 U.S.C. § 119, to UK Patent Application No. 1809758.4, filed Jun. 14, 2018, titled "Drill Bit," which is hereby incorporated by reference.

BACKGROUND

The present invention relates to drill bits, in particular masonry drill bits, having a helical flute portion between the drilling head and the shank attachment portion. Such drill bits can be used with rotary hammer drills to drill into hard substrates such as masonry, concrete or stone. Drill bits intended for masonry use may have a hard cutting plate, commonly made of tungsten carbide. The cutting plate removes material from the base of the hole being drilled, and the removed material is transported away from the base of the hole along the helical flutes.

Drilling operations using such drill bits involve high levels of stress on all parts of the drill bit, including the flutes as well as the drilling head. Furthermore, each drilling operation may be of relatively long duration compared to typical drilling operations in other materials, due to the hardness of the material and/or the depth of the holes being drilled. At any given time in the drilling operation, the part of the flute portion inside the hole being drilled is subjected to a different set of forces compared to the rest of the flute portion. One mode of drill bit failure is flute breakage, which typically occurs by fracture into two or more parts. Flute breakage may occur in the region near the head, or near to the point where the fluted portion ends at the shank. Vibrations of the drill bit during drilling operations may contribute to such failures.

SUMMARY

The aim of the present invention is to provide an improved drill bit which is more resistant to failure. The present invention provides an improved drill bit according to the claims. The features of the claims may be applied to any dimension of bit, but may be particularly beneficial for smaller diameter, longer length bits, where the ratio of length to flute diameter is high, for example to bits having nominal diameters less than 12 mm and preferably between 10 mm and 5 mm. Longer length drill bits are needed for example to drill deep holes for anchors or other fixing requirements, but considerable forces are applied to the flute portion while drilling. Deep holes may take longer to drill compared to shallower holes and therefore the time for which such forces are applied to the flute portion during one drilling operation may be longer.

BRIEF DESCRIPTION OF THE DRAWINGS

The invention is herein described, by way of example only, with reference to the accompanying drawings.

DETAILED DESCRIPTION

Figure 1:
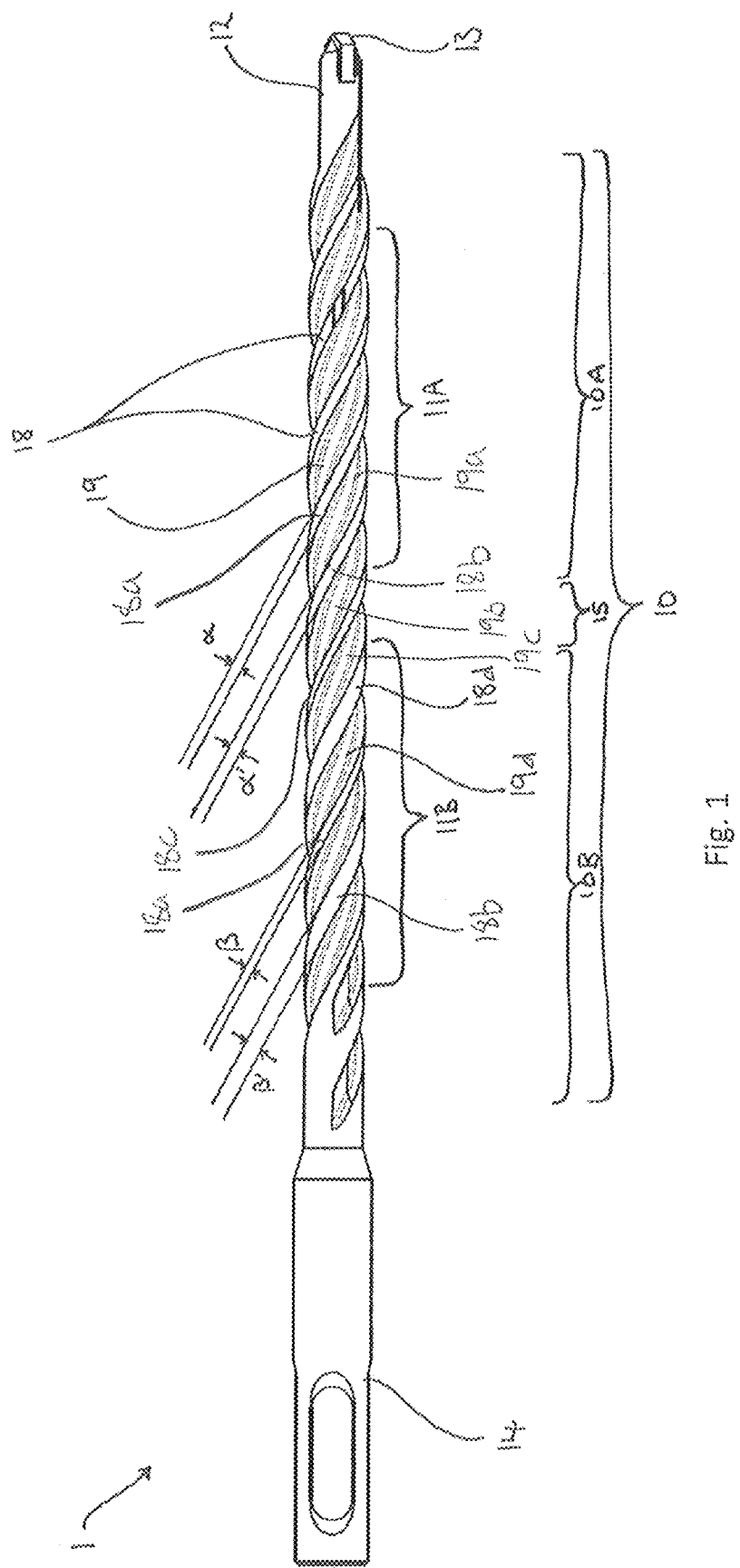
FIG. 1 is a side view of a masonry drill bit according to the present invention.

Referring to FIG. 1, in an embodiment, a drill bit 1 has a central axis X, a drilling head 12 at its forward working end, a clamping shank 14 at its rearward end, and a helical conveying portion 10 extending between the drilling head 12 and the clamping shank 14. The clamping shank 14 of the drill bit 1 may be of any standard type, for example an SDS-plus type shank as shown in FIG. 1, for be coupled to a chuck or bit holder of a power tool, and the drilling head 12 includes a carbide insert 13 for drilling. The helical conveying portion 10 comprises at least two, e.g., four, helically extending flutes 19 for conveying drilling waste away from the drilling head, the flutes being separated by at least two, e.g., four, corresponding helically extending webs 18. In the illustrated embodiment, the helical conveying portion 10 includes first, second, third, and fourth flutes 19a-19d, and first, second, third, and fourth helical webs 18a-18d. Web widths $\alpha$, $\alpha'$, $\beta$ and $\beta'$ of the webs 18 are measured at the external diameter of the helical conveying portion 10, perpendicular to the elongated direction of each web 18. Each of the walls and base of the channels forming the flutes 19 may have a profile that is approximately flat or slightly curved, or another conventional form. In particular the base of each flute channel may be substantially flat, angled or curved. Optionally, drill bits according to the invention may have more than four helically extending flutes throughout the helical conveying portion or just in a section of it. It may be desirable to have four separate flutes as a compromise between ease of conveying material away from the drilling head 12 and the strength of the helical conveying portion 10.

As shown in FIG. 1, the helical conveying portion 10 comprises a changeover portion 15, a pre-changeover portion 10A between the drilling head 12 and the changeover portion 15, and a post-changeover portion 10B between the changeover portion 15 and the clamping shank 14. In the pre-changeover portion 10A, the first and third webs 18a, 18c each have a first pre-changeover web width $\alpha$ and the second and fourth webs 18b, 18d each have a second pre-changeover web width $\alpha'$, each of which may be between approximately 1 mm and 3 mm. Drill bits with smaller nominal diameters may have web widths $\alpha$ and $\alpha'$ at the lower end of this approximate range. In the post-changeover portion 10B, the first and third webs 18a, 18c each have a first post-changeover web width $\beta$ and the second and fourth webs 18b, 18d each have a second post-changeover web width $\beta'$. The first post-changeover web width $\beta$ is less than the first pre-changeover web width $\alpha$, for example between approximately 20% and 40% less than the web width $\alpha$ (such as approximately 30% less). The second post-changeover web width $\beta'$ is greater than the second pre-changeover web width $\alpha'$, for example between approximately 40% and 60% greater than the web width $\alpha'$ (such as approximately 50% greater).

In the pre-changeover portion 10A, the flutes 19 have a pre-changeover pitch 11A and in the post-changeover portion 10B the flutes 19 have a post-changeover pitch 11B, the change between the two pitches occurring in the changeover portion 15. Pitch in this application refers to axial length per rotation. The pre-changeover pitch 11A may be around 5 times the nominal width of the drill bit. For example, in a drill bit with a nominal width of 8 mm, the pre-changeover pitch 11A may be between 35 mm and 55 mm, for example around 40 mm. In drill bits with a higher or lower nominal width, the pre-changeover pitch 11A may be higher or lower than these examples. The person skilled in the art will recognize that the selected pitch represents a compromise between speed and ease of removal of the drilling waste, and drilling stability and strength of the drill bit. The post-changeover pitch 11B may be higher than pre-changeover pitch 11A by approximately between 10% and 20%, preferably between 13% and 15% of pre-changeover pitch 11A. Optionally there may be at least one full revolution of the flutes between the working end and the changeover, but there may be more or fewer than one full revolution, for example if the overall length of the drill bit is relatively long or short, respectively.

The changeover itself may be a point along the length of the drill bit, but in an embodiment, it is a short region extending over a small part of the length, for example 1% to 10% of the length of the helical conveying portion such that the change in pitch and web width that takes place at the changeover can be gradual rather than abrupt. The changeover may be approximately half-way along the flute portion. For example, it's center may fall at a point between 40% and 60% of the total distance along the fluted portion from the working end. This roughly central positioning can assist in fast removal of the drilling waste and help to prevent slowing of drilling when a longer drill bit is significantly inserted into a deep hole.

The pre-changeover portion 10A may extend along substantially an entirety of the helical conveying portion from the changeover portion 15 to the drilling head, with the webs 18 in this portion having a substantially constant width and the flutes 19 in this portion having a substantially constant pitch. The post-changeover portion 10B may extend along substantially an entirety of the helical conveying portion from the changeover portion 15 to the clamping shank 14, with the webs 18 in this portion having a substantially constant width and the flutes 19 in this portion having a substantially constant pitch.

Due to the change in the flute pitch and web widths, the weight distribution and the weight per unit length of the flute portion may be different before and after the changeover portion. The bending characteristics of the flute portion are also different before and after the changeover portion. This arrangement allows the forces and/or shock waves travelling along the fluted portion to be mitigated or dispersed to a greater extent than if the flute pitch is constant.

Compared to drill bits having a constant flute pitch along the length of the flute portion, the levels of vibrations during drilling are lower in drill bits having flute portions with a changeover portion according to this patent application. It is known that lower levels of vibration leads to better performance in terms of hole dimensions and can help to reduce failure by breakage of the bit.

Drill bits according to the present invention may also include, on one or more of the radially outer surfaces of the webs, a wear mark in the form of a groove, to provide an indication of wear to the user. The depth of the flutes may be uniform along the length of the fluted portion or may have a gradual slight decrease from the working end towards the shank end, forming a slightly tapered core.

In drill bits according to the invention, the pitch and the web widths of each web are altered while keeping the area per unit length which may have contact with the wall of the drilled hole roughly similar between the forward and rearward portions, which it has surprisingly been found leads to lower risk of flute failure, while maintaining or increasing the distance which a drill bit can successfully drill in its lifetime. Distance a drill bit can drill refers to the total of the depths of all holes that a drill bit can drill in its lifetime (e.g., if a drill bit can drill 50 holes each having a depth of 2 inches during its lifetime, then the distance drilled will be 100 inches). The alterations at the changeover mitigate damaging vibrations and contribute to a more stable overall performance throughout a drilling operation.

Figure 2:
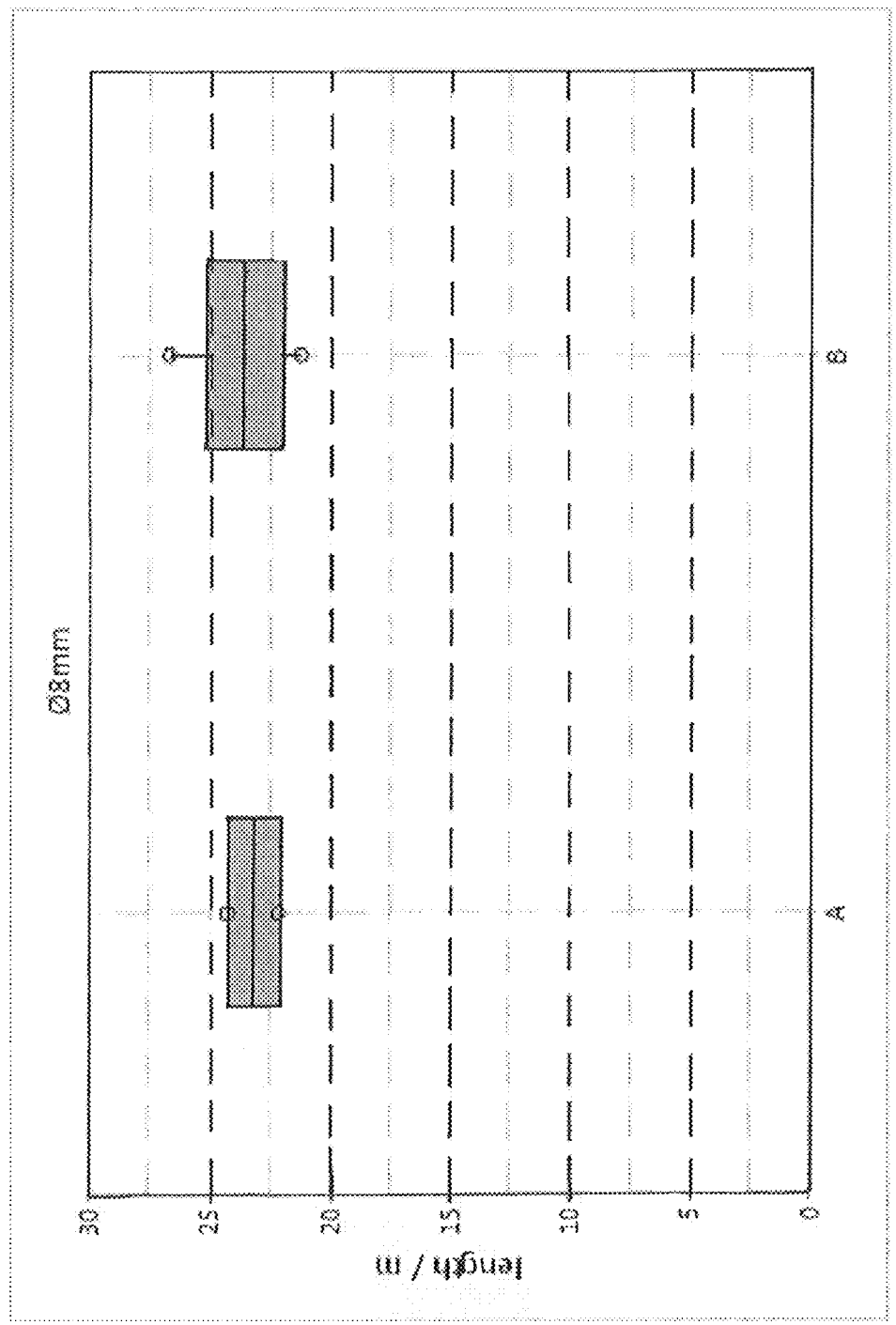
FIG. 2 is a plot showing results of drilling length comparison tests for drill bits according to the present invention.
Figure 3:
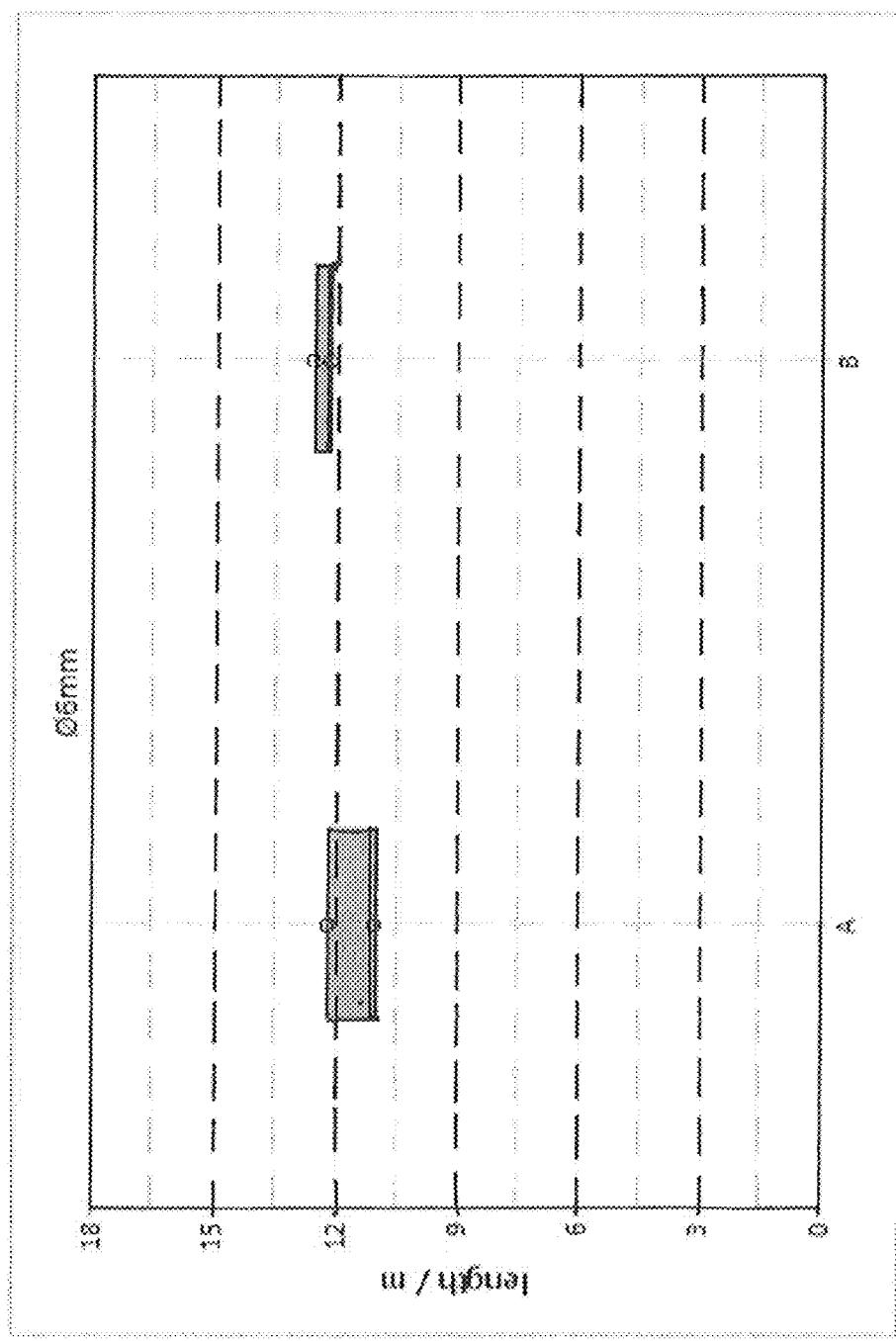
FIG. 3 is a plot showing results similar to FIG. 2 for drill bits of a different diameter.

FIGS. 2 and 3 show test results for drill bits of two different sizes having fluted portions according to the invention. A comparison drill bit design having a constant flute pitch and web widths, and as such having no changeover, was tested as sample A. The sample B drill bit design has a similar head, flute and shank geometry to the sample A design, but with a changeover in the fluted portion, the flute pitch and web widths being in accordance with the present invention as generally shown in FIG. 1. The drill bits tested in the samples of FIG. 2 have a nominal diameter of 8 mm and those in the samples of FIG. 3 have a nominal diameter of 6 mm. In the present tests the nominal lengths of each bit tested was 210 mm. As shown, there is an increase in the distance which can be drilled, and an overall improvement in performance for the bits according to the present invention. In particular, the drill bits of smaller diameter have an 8% increase in average length drilled by each sample before the end of the test, which is a significant improvement over the comparison drill bits. The failure mode of the drill bits in the samples were recorded, for example, failure by means of general wear i.e. expected aging through use, failure by carbide breakage or failure by flute breakage. Flute breakage can be a more common failure mode for drill bits of small nominal diameter, due to the significant stresses due to drilling into hard substrates. In the drill bits of the samples of FIG. 3, for the comparison drill bits of sample A, approximately 50% of the failures were flute breakage failures, and 50% were wear-type failures. The drill bits of sample B had an improved failure record, in that only approximately 25% of these drill bits failed by flute breakage, the remainder failing by wear-type failure.

Figure 4:
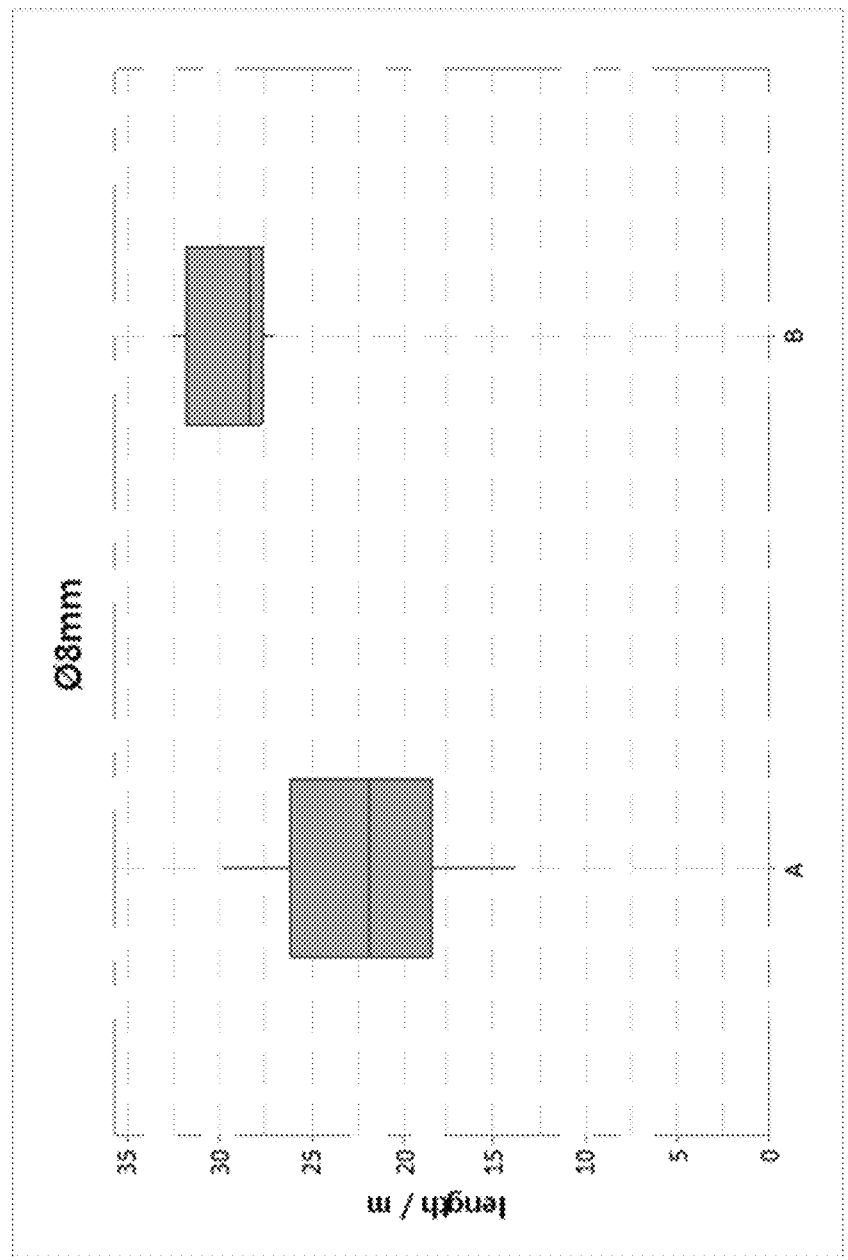
FIG. 4 is a plot showing results of drilling length comparison tests for a different sample of drill bits according to the present invention.
Figure 5:
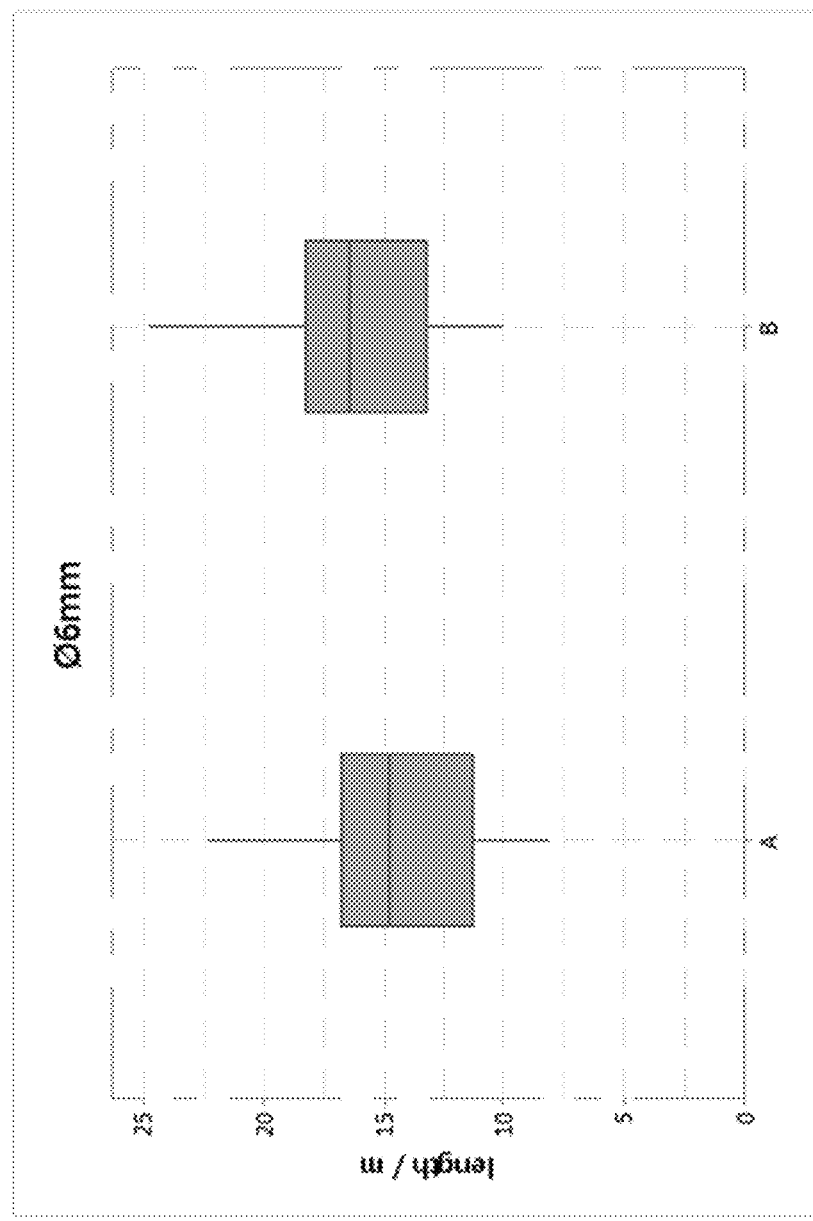
FIG. 5 is a plot showing results similar to FIG. 4 for drill bits of a different diameter.

FIGS. 4 and 5 show test results for drill bits of two different sizes having fluted portions according to the invention, all of length 310 mm. Sample A is a comparison drill bit design having a constant flute pitch and web widths, and as such having no changeover. The sample B drill bit design has a similar head, flute and shank geometry to the sample A design, but with a changeover in the fluted portion, the flute pitch and web widths being in accordance with the present invention as generally shown in FIG. 1. The drill bits tested in the samples of FIG. 4 have a nominal diameter of 8 mm and those in the samples of FIG. 5 have a nominal diameter of 6 mm. Again, there is an increase in the total distance which can be drilled by the B samples, and an overall improvement in performance for the bits according to the present invention. All testing was carried out on concrete of strength class 35/45. In the drill bits of the samples of FIG. 4, ⅝th of the failures for both samples were wear-type failure. However, for the smaller diameter samples of FIG. 5, the drill bits of sample B had a better failure record than the comparison sample A, in that only approximately 50% of the drill bits of sample B failed by flute or head breakage, while 50% failed by wear-type failure. For the comparison drill bits of sample A in FIG. 5, 75% of the failures were flute or head breakage failures, and only 25% were wear-type failures.

It should be understood that although the invention has been described in conjunction with specific embodiments thereof, it is evident that many alternatives, modifications and variations will be apparent to those skilled in the art.

Accordingly, it is intended to embrace all such alternatives, modifications and variations that fall within the scope of the claims.

What is claimed is:

1. A drill bit comprising:
a drilling head at a forward end of the drill bit;
a shank at a rearward end of the drill bit and configured to be driven by a power tool; and
a helical conveying portion extending between the drilling head and the shank and having a changeover portion, a pre-changeover portion between the drilling head and the changeover portion, and a post-changeover portion between the changeover portion and the shank, the helical conveying portion including a first helical flute and a second helical flute separated by a first helical web and a second helical web,
wherein, in the pre-changeover portion, the first and second flutes have a constant pre-changeover pitch, the first web has a first pre-changeover web width, and the second web has a second pre-changeover web width, and in the post-changeover portion the flutes have a post-changeover pitch, the first web has a first post-changeover web width and the second web has a second post-changeover web width, and
wherein the post-changeover pitch is greater than the pre-changeover pitch, the first post-changeover web width is less than the first pre-changeover web width, and the second post-changeover web width is greater than the second pre-changeover web width.

2. The drill bit of claim 1, wherein the drilling head comprises at least one carbide insert.

3. The drill bit of claim 1, wherein the changeover portion spans between 1% and 10% of a total length of the helical conveying portion.

4. The drill bit of claim 1, wherein in the changeover portion, the first and second flutes have a changeover pitch that gradually increases from the pre-changeover pitch to the post-changeover pitch, the first web has a first changeover web width that gradually decreases from the first pre-changeover web width to the first post-changeover width, and the second web has a second changeover web width that gradually increases from the second pre-changeover web width to the second post-changeover web width.

5. The drill bit of claim 1, wherein the changeover portion is centered approximately 40% to 60% along a total length of the helical conveying portion from the drilling head.

6. The drill bit of claim 1, wherein the post-changeover pitch is between 10% and 20% greater than the pre-changeover pitch.

7. The drill bit of claim 6, wherein the post-changeover pitch is between 13% and 15% greater than the pre-changeover pitch.

8. The drill bit of claim 1, wherein the first post-changeover web width is between 20% and 40% less than the first pre-changeover web width.

9. The drill bit of claim 8, wherein the first post-changeover web width is approximately 30% less than the first pre-changeover web width.

10. The drill bit of claim 1, wherein the second post-changeover web width is between 40% and 60% greater than the second pre-changeover web width.

11. The drill bit of claim 10, wherein the second post-changeover web width is approximately 50% greater than the second pre-changeover web width.

12. The drill bit of claim 1, wherein a diameter of the drill bit is 13 mm or less, and a total length of the helical conveying portion is at least 160 mm.

13. The drill bit of claim 1, wherein the helical conveying portion further includes a third helical flute and a fourth helical flute separated by a third helical web and a fourth helical web.

14. The drill bit of claim 13, wherein, in the pre-changeover portion, the third and fourth flutes have the pre-changeover pitch, the third web has the first pre-changeover web width, and the fourth web has the second pre-changeover web width, and in the post-changeover portion the third and fourth flutes have the post-changeover pitch, the third web has the first post-changeover web width, and the fourth web has the second post-changeover web width.

15. The drill bit of claim 1, wherein the pre-changeover portion extends along substantially an entirety of the helical conveying portion from the changeover portion to the drilling head and the post-changeover portion extends along substantially an entirety of the helical conveying portion from the changeover portion to the shank.

16. The drill bit of claim 1, wherein the first pre-changeover width is substantially constant throughout the pre-changeover portion and the first post-changeover width is substantially constant throughout the post-changeover portion.

17. The drill bit of claim 16, wherein the second pre-changeover width is substantially constant throughout the pre-changeover portion and the second post-changeover width is substantially constant throughout the post-changeover portion.

18. A drill bit comprising:
a drilling head at a forward end of the drill bit;
a shank at a rearward end of the drill bit and configured to be driven by a power tool; and
a helical conveying portion extending between the drilling head and the shank and having a changeover portion, a pre-changeover portion between the drilling head and the changeover portion, and a post-changeover portion between the changeover portion and the shank, the helical conveying portion including a first helical flute, a second helical flute, a third helical flute, and a fourth helical flute separated by a first helical web, a second helical web, a third helical web, and a fourth helical web,
wherein, in the pre-changeover portion, the flutes have a constant pre-changeover pitch, the first web and the third web each have a first pre-changeover web width, and the second web and the fourth web each have a second pre-changeover web width, and in the post-changeover portion the flutes have a post-changeover pitch, the first web and the third web each have a first post-changeover web width, and the second web and the fourth web each have a second post-changeover web width, and
wherein the post-changeover pitch is greater than the pre-changeover pitch, the first post-changeover web width is less than the first pre-changeover web width, and the second post-changeover web width is greater than the second pre-changeover web width, and
wherein, in the changeover portion, the flutes have a changeover pitch that gradually increases from the pre-changeover pitch to the post-changeover pitch, the first web and the third web have a first changeover web width that gradually decreases from the first pre-changeover web width to the first post-changeover width, and the second web and the fourth web have a second changeover web width that gradually increases from the second pre-changeover web width to the second post-changeover web width.

19. The drill bit of claim 18, wherein the pre-changeover portion extends along substantially an entirety of the helical conveying portion from the changeover portion to the drilling head and the post-changeover portion extends along substantially an entirety of the helical conveying portion from the changeover portion to the shank.

20. The drill bit of claim 19, wherein the first pre-changeover width is substantially constant throughout the pre-changeover portion, the first post-changeover width is substantially constant throughout the post-changeover portion, the second pre-changeover width is substantially constant throughout the pre-changeover portion, and the second post-changeover width is substantially constant throughout the post-changeover portion.

* * * * *